United States Patent [19]

Florens et al.

[11] Patent Number: 5,413,901
[45] Date of Patent: May 9, 1995

[54] RADIOGRAPHIC FILM PACKAGE FOR NON-DESTRUCTIVE TESTING PURPOSES

[75] Inventors: Raymond Florens, Edegem; Hubert Vandenabeele, Mortsel; Paul Wouters, O.L.V. Waver, all of Belgium

[73] Assignee: AgfaGevaert, N.V., Mortsel, Belgium

[21] Appl. No.: 152,744

[22] Filed: Nov. 16, 1993

[30] Foreign Application Priority Data

Nov. 25, 1992 [EP] European Pat. Off. .......... 92203639

[51] Int. Cl.⁶ .............................................. G03C 1/46
[52] U.S. Cl. ........................... 430/502; 430/523; 430/527; 430/139; 430/966; 430/961; 378/169; 378/182; 206/809; 206/455
[58] Field of Search ............... 430/502, 523, 527, 134, 430/966, 961; 378/169, 182; 206/809, 455

[56] References Cited

U.S. PATENT DOCUMENTS

| | | | |
|---|---|---|---|
| 4,537,306 | 8/1985 | Muylle | 206/455 |
| 4,596,766 | 6/1986 | Nemori et al. | 430/527 |
| 4,900,652 | 2/1990 | Dickerson et al. | 430/502 |
| 4,956,270 | 9/1990 | Tachibana et al. | 430/523 |
| 4,975,363 | 12/1990 | Cavallo et al. | 430/523 |
| 5,041,364 | 8/1991 | Dickerson et al. | 430/502 |

OTHER PUBLICATIONS

Research Disclosure, Aug. 1979, Item 18431, Radiographic Films/Materials.

*Primary Examiner*—Thomas R. Neville
*Attorney, Agent, or Firm*—Breiner & Breiner

[57] ABSTRACT

A radiographic film package for non-destructive testing purposes has been developed, comprising a radiographic film sheet which is composed of a film support coated at both sides with one or more silver halide emulsion layer(s) and one or more non-light-sensitive protective antistress coating(s) thereover, and a wrapper around said film sheet which is light-opaque and air-tight, and which comprises a heat-sealable thermoplastic layer at the inner side of the wrapper, a transparent polymer layer at the outer side of the wrapper and a layer of aluminum located between said transparent polymer layer and said heat-sealable thermoplastic layer, and wherein at least one antistatic layer coating is provided between the said thermoplastic layer of said wrapper and the emulsion layers of said film sheet.

8 Claims, 1 Drawing Sheet

RADIOGRAPHIC FILM PACKAGE FOR NON-DESTRUCTIVE TESTING PURPOSES

DESCRIPTION

1. Field of the Invention

The present invention relates to a radiographic film package for non-destructive testing purposes comprising a radiographic film sheet and a light-tight wrapper around said film sheet.

2. Background of the Invention

In industrial radiography packaging is a very important element in the whole system in addition to film, processing chemicals and processing apparatus. The packaging should especially be strong enough to resist damaging in the work field as e.g. by bending operations of the material around an object to be examined. Additionally, it should be impermeable to water (humidity), oils and fatty acids as well as grease.

Film packages of the described type are known as "DW film", i.e. double wrapped film, since a plurality of equal film packages are packed together in a second package, for instance a cardboard box. The mentioned film packages are used on a large scale for the radiographing of industrial objects, such as the weld seams of pipelines.

Known film packages comprise a radiographic film sheet, an inner wrapper around said film sheet with a layer of lead that is in contact with the film sheet on at least one side of the film sheet thereby to operate as an intensifying screen, and an outer wrapper around the inner wrapper which is light-opaque and which has a heat-sealable thermoplastic layer at the inner side of the package.

A disadvantage of known film packages is the presence of air in the film package. Said air causes local air cushions whereby some distance may be created between the film and lead intensifying screens incorporated in the package. Said air further makes the package behave as a three dimensional hollow body that is subjected to buckling load at its side that is concavely curved in use. The latter situation notably occurs in those applications where the film package is bent around a curved object in order to make an exposure, as for example in the case of the examination of weld seams of pipelines. The buckling of the concave side of the film package will create local areas of contact between the film and the corresponding lead screen, as well as local areas of separation over several tenths of a millimeter between the film and the screen. A separation between the film and the screen reduces the image sharpness and the image contrast but, unfortunately, such reduction cannot always be readily recognized in the absence of a test pattern.

It has been proposed to improve the contact between the film and the intensifying screens by packaging the film under vacuum. A package for radiographic film for non-destructive testing, that is readily to be manufactured and that offers an excellent contact between the film and the lead screen, even after prolonged periods, has been described in EP-Specification 37 594.

According to this EP-Specification 37 594, the radiographic film package for non-destructive testing comprises a radiographic film sheet, a foil wrapper with a layer of lead that is in contact with the film sheet and a wrapper around said film sheet and said foil which is light-opaque, air-tight, has a heat-sealable thermoplastic layer at the inner side of the package and a polyethylene terephthalate layer at the outside of the package and a layer of aluminum located between said polyethylene terephthalate layer and said heat-sealable thermoplastic layer. The heat-sealable thermoplastic layer of the wrapper at the inside of the package is arranged in such a way that the wrapper may easily be peeled open, by rupturing a surface stratum only (an easy peel resin coat) of said thermoplastic layer. In the mentioned way, one may dispense with the usual tear-strip for opening the package.

The layer of aluminum has been formed by vacuum deposition of aluminum on the polymer (polyethylene terephthalate) layer. The said polymer layer at the outer side of the wrapper is preferably transparent. In the mentioned way, the aluminum layer forms a surface with a highly reflective power whereby absorption of IR radiation by the package and resultant heating of the contents is minimized.

An extra beneficial effect of the lead foil is that it is electroconductive so that it prevents the formation of static discharges when taking out the film from the package which would otherwise lead to undesirable exposure of the film.

For low energy X-ray exposure of the radiographic film, e.g. in the case of inspection of composite materials, no lead foils can be used in the packed film. Instead of said electroconductive lead foil a thin paper folder may be placed between the film sheet and the thermoplastic easy peel resin layer to avoid sparks at the moment that the film is removed from its package after exposure. However this measure is not satisfactory as with low energy X-ray exposures smaller than 50 kVp the fibrous structures of the paper sheet may be depicted on the film sheet after processing so that the diagnostic value of the obtained image is questionable.

OBJECTS OF THE INVENTION

Therefore it has been an object of this invention to provide a radiographic film package for non-destructive testing purposes, which provides excellent images of high diagnostic value from objects, that are exposed with low energy X-rays and with which the problem of static discharges is reduced.

Another object within the same scope has been the development of a cheaper and ecologically less environment loading package.

SUMMARY OF THE INVENTION

In accordance with this invention a radiographic film package for non-destructive testing purposes has been developed, comprising a radiographic film sheet which is composed of a film support coated at both sides with one or more silver halide emulsion layer(s) and one or more non-light-sensitive protective antistress coating(s) thereover, and a wrapper around said film sheet which is light-opaque and air-tight, and which comprises a heat-sealable thermoplastic layer at the inner side of the wrapper, a polyethylene terephtalate layer at the outer side of the wrapper and a layer of aluminum located between said polyethylene terephtalate layer and said heat-sealable thermoplastic layer, characterized in that there is at least one antistatic layer coating provided between the said thermoplastic layer of said wrapper and the emulsion layers of said film sheet.

DETAILED DESCRIPTION

Figure 1:
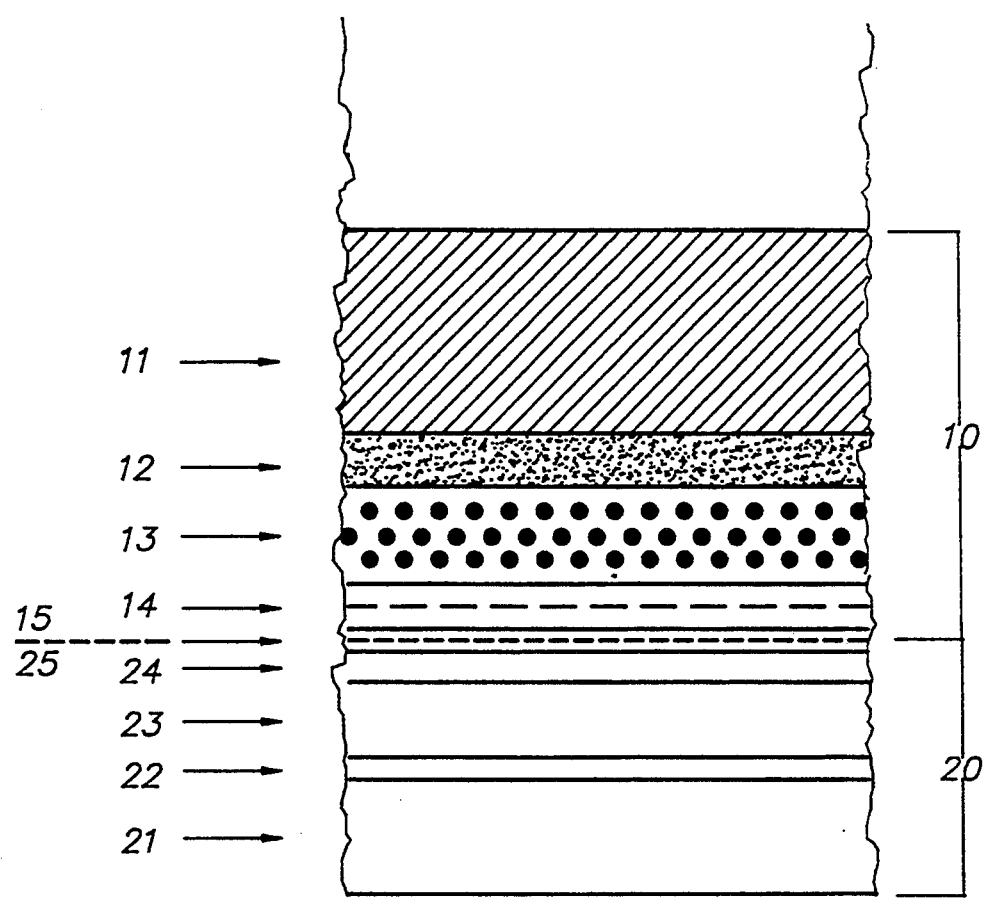

The antistatic layer(s) provided between the thermoplastic layer of the wrapper and the emulsion layers at both sides of the film sheet may be coated on said thermoplastic layer or on an easy peel resin layer provided over said thermoplastic layer and/or on the protective layers on both sides of the film. It is also possible to provide that the protective antistress coatings on both sides of the film form antistatic layers.

FIG. 1 is a schematic representation of a radiographic film package according to the present invention.

In FIG. 1, the cross-section of the film package without lead foil for low-energy non-destructive testing applications does not take into account the exact relative thicknesses of the different layers.

In FIG. 1, 10 represents the film and 20 represents the wrapper. With respect to the film the numbers 11,12,13,14 and 15 respectively represent the base, the substrate layer, the emulsion layer(s), the protective antistress layer(s) and an antistatic layer, whereas with respect to the wrapper the numbers 21, 22, 23, 24 and 25 represent the polyethylene terephtalate layer, the aluminum layer, the thermoplastic layer, the easy peel resin coat and the antistatic layer(s).

If the at least one antistatic layer is applied to the easy peel resin coat layer, it has to be recommended to make use of an antistatic agent or agents in the coated layer formulations so as to obtain the smallest possible triboelectrical differences between the antistatic layer and the protective antistress layer(s) of the double side-coated film sheet that are in direct contact with each other.

In a preferred embodiment in accordance with this invention coating compositions comprising the same antistatic agent(s) are applied both on the thermoplastic easy peel resin coat layer of the wrapper and on (or in) the protective antistress layer(s) of the film.

As antistatic agents water-soluble conductive polymers may be used having at least one conductive group selected from a sulphonic acid group, a sulphate-group, a phosphate-group, a quaternary ammonium salt group, a tertiary sulfonium salt group, a carboxyl group and a polyoxyethylene group. The conductive group may be linked directly to the polymer, through a divalent coupling group or to an aromatic, heterocyclic ring as e.g. a benzene ring or a pyridine ring.

The conductive polymers may further include at least one of the group selected from styrene, vinylidene chloride, acrylic acid, methacrylic acid, itaconic acid, itaconic esters or butadiene.

The most useful polymers for embodying the invention are generally those having an average molecular weight of about $10^3$ to $10^6$.

In the antistatic layers in accordance with this invention amounts of conductive polymer expressed in solid matter varying from 0.0001 to 10 $g/m^2$ may be added and more preferably from 0.001 to 1 $g/m^2$.

Instead of or in addition to conductive polymers, the antistatic layers may comprise antistatic compounds.

Especially preferred antistatic compounds to be used in accordance with this invention are fluorinated compounds, in particular fluorinated surfactants, like e.g. perfluorocaprilic acid or its salts and hydrophilic polymers with polyoxyethylene units and a terminal fluorinated group.

A preferred useful fluorinated compound for use in accordance with this invention is a group with oxyethylene groups that can be represented by the formula $$R_F\text{---}A\text{---}X \qquad (I)$$

wherein:

$R_F$ stands for a partly or wholly fluorinated hydrocarbon chain comprising at least 3 fluorine atoms, A stands for a chemical bond, a bivalent hydrocarbon group including a bivalent hydrocarbon group interrupted by one or more hetero atoms, or the group —COO, —CON(R)—, —SO$_2$N(R)— or SO$_2$N(R) CO wherein R is hydrogen or alkyl comprising from 1 to 5 C-atoms, X stands for a hydrophilic oxyalkylene group containing one or more oxyethylene groups.

Further any of the generally known polyethylene oxide polymers is useful as an antistatic agent for use according to the present invention; a preferred antistatic agent is a polyethylene oxide compound corresponding to formula (II)

$$R\text{---}O\text{---}(CH_2CH_2O)_n\text{---}H \qquad (II)$$

wherein n is an integer of at least 4 preferably between 8 and 30 and R represents a long chain alkyl or alkylaryl group having at least 10 C-atoms as e.g. oleyl.

Different antistatic agents as described hereinbefore may be present as mixtures in the antistatic layer(s) in this invention, the mixtures being the same or different for the different antistatic layers.

The antistatic layers in accordance with this invention may further contain a latex. Such latexes preferably contain an acrylate or a methacrylate component esterified with an alkyl group in the polymer molecules thereof. Examples of such latex components include e.g. methyl acrylate, ethyl acrylate, butyl acrylate, methyl methacrylate, ethyl methacrylate and butyl methacrylate.

Methods of coating radiographic film packages described hereinbefore with at least one antistatic coating layer are well-known from the state-of-the-art.

Said at least one antistatic coating may be applied to the inner side of the heat sealable thermoplastic wrapper by means of roller coating, slide-hopper coating, curtain coating, spray coating or, and preferably, by gravure printing. On top of the at least one non-light-sensitive protective antistress layer at both sides of the film sheet at least one antistatic layer may be applied by means of roller coating, slide-hopper coating, curtain coating or spray coating techniques.

Alternatively at least one antistatic agent may be added to said at least one non-light-sensitive protective antistress layer.

Application by coating techniques like roller coating, slide-hopper coating and curtain coating of an aqueous composition may bring along the necessity to add one or more polymeric gelatin or non-gelatin thickening agents together with the antistatic coating compositions.

Any thickening agent may be used so as to regulate the viscosity of the solution used for slide-hopper or curtain coating provided that they do not particularly affect the photographic characteristics of the silver halide light-sensitive photographic material. Preferred thickening agents include aqueous polymers such as polysaccharides, polymers having a sulphonic acid group as e.g. polystyrene sulphonic acid, a carboxylic acid group or a phosphoric acid group, polyacrylamide, polymethacrylic acid or its salt, copolymers from acrylamide and methacrylic acid and salts derived thereof, copolymers from 2-acrylamido-2-methyl-propansulphonic acid, polyvinyl alcohol, alginate, xanthane, carraghenan and the like. Polymeric thickeners well-known from the literature resulting in thickening of the coating solution may be used independently or in combination. Patents concerning thickening agents suitable for use according to the present invention are U.S. Pat. No. 3,167,410, Belgian Patent No. 558,143, JP OPI Nos. 53-18687 and 58-36768 and DE 3,836,945. As a preferred polymeric thickener use can be made of the product characterized by formula (III), with x/y varying from 5/95 to 95/5.

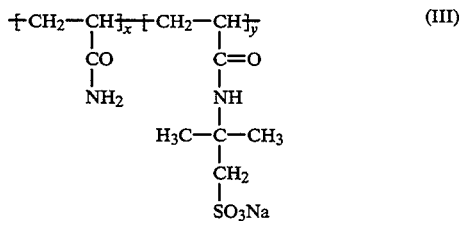

According to a preferred embodiment the antistatic surface layer(s) is(are) applied by spraying a gelatin free aqueous composition containing the antistatic agents onto the at least one antistress layer at both sides of the film. Suitable spray coating techniques have been described in WO 92014188. Besides advantages offered by the spray-coating technique as there is the possibility to perform a coating without hydrophilic colloid binder a much more important advantage consists in the application of a strongly reduced coated amount of antistatic agent, e.g. polyoxyethylene, in an amount of 10 mg/m$^2$ where normal amounts being coated from solutions are about 40 mg/m$^2$. As a consequence the thickness of the antistatic layer is reduced to 0.5 to 1.0 μm, whereas with curtain coating or slide hopper coating techniques the thickness varies between 7 and 10 μm.

It is also possible to atomize the antistatic coating composition using ultrasonic vibration and to spray the coating composition on the continuously moving support as has been described in U.S. Pat. No. 4,218,533.

The application of a thin layer of antistatic agent to the top surface of a photographic material may follow the same procedure as described hereinbefore.

By using a recording film material and a thermoplastic wrapper having an antistatic layer according to the present invention, with the recording material and thermoplastic wrapper in intimate contact, the problems caused by static charges prior to processing by removal of the film out of its package material can be avoided or substantially reduced even if there is no conductive layer like a lead foil or a spark-preventing paper folder present between the two materials, offering the additional advantage to have less waste product, thereby reducing the environmental load.

Such means that the formation of static charges by contact of the light-tight, air-tight packed recording silver halide photographic material with the thermoplastic wrapper can be markedly reduced by employing the present antistatic layer or layers as described hereinbefore.

The examples hereinafter set forth are directed to the use of an antistatic layer coated onto both the thermoplastic wrapper and the film recording material for industrial radiographic applications at low kVp-energy exposures, said film recording material having a polyethylene terephthalate resin support. For said film recording material other resin supports, e.g. those made of polystyrene, polyvinyl chloride, cellulose ester such as cellulose triacetate, or polyethylene either or not treated by corona-discharge and/or subbed with (a) subbing layer(s) for improving the adherence of hydrophilic colloid layers may also be used.

The following examples illustrate the present invention without however limiting it thereto.

EXAMPLES

Example 1

In example 1 an antistatic coating was applied by means of the spray coating technique to the inner side of a wrapper consisting of a polyethylene terephtalate layer, a vacuum deposited aluminum layer, a light-tight carbon-black pigmented low-density polyethylene layer and an easy peel resin coat comprising low-density polyethylene, mixed with a non-compatible polymer.

The spray was composed of an aqueous composition of two fluorinated antistatic compounds being a hydrophilic polymer having the formula $C_7F_{15}CONH\text{---}(CH_2\text{---}CH_2)_n\text{---}(O\text{---}CH_2\text{---}CH_2\text{---})_m\text{---}OH$ (compound A) and the ammonium salt of perfluorocaprilic acid (compound B).

The effect of the incorporation of antistatic agents onto the wrapper was evaluated by measuring the charge decay time (hereinafter referred to as CDT) as described on pages 104 and following of the 'Encyclopedia of Polymer Science and engineering', Vol. 2. The results obtained for coatings with different amounts of antistatic compounds A and B are given in Table I for atmospheric conditions of 50% R(elative) H(umidity) and 20° C.

TABLE I

| amount of compound A (mg/m$^2$) | amount of compound B (mg/m$^2$) | CDT (50% RH; 20° C.) |
|---|---|---|
| 0 | 0 | >10 min. |
| 5 | 2 | 15 s |
| 10 | 4 | 3 s |
| 50 | 20 | 0.5 s |
| 100 | 40 | 0.3 s |

Table I illustrates that higher amount of compounds A and B leads to shorter decay times, indicating that the antistatic properties of the wrapper become remarkably better when doing so.

Example 2

In example 2 an antistatic coating having the same composition as in example 1 was applied to the inner side of a wrapper having the same composition as in example 1 by means of the spray coating technique.

An evaluation of the antistatic properties of the wrapper was made by measurement of the lateral surface resistance (LSR) and charge decay times (CDT) mentioned in example 1, taken as a representative parameters to characterize the antistatic properties thereof.

Said lateral surface resistance is expressed in ohm/square (ohm/sq.) and is measured by a test proceeding as follows:

two conductive copper poles having a length of 10 cm parallel to each other were placed at a distance of 1 cm onto the surface to be tested and the resistance built up between said electrodes is measured with a precision ohm-meter. By multiplying the thus determined ohm value with the factor 10 the surface resistance value expressed as ohm/square (ohm/sq) is obtained.

The results obtained for coatings with different amounts of antistatic compounds A and B are given in Table II. In this case the atmospheric conditions (relative humidity as % RH, temperature T in ° C.) were changed for the detection of changements in the measurements of the charge decay time. In circumstances of 30% RH at 20° C. lateral surface resistance values were measured at fresly coated wrappers and the same wrappers after 30 days.

TABLE II

| Coating composition | | LSR (in ohm/sq × $10^{10}$) atmosph. | |
|---|---|---|---|
| amt. of compound A ($mg/m^2$) | amt. of compound B ($mg/m^2$) | cond. 30% RH; 20° C. | |
| | | fresh | after 30 days |
| 0 | 0 | 10000 | 27000 |
| 10 | 4 | 23 | 32 |

| Coating composition | | CDT atmospheric conditions | |
|---|---|---|---|
| amt. of compound A ($mg/m^2$) | amt. of compound B ($mg/m^2$) | 30% RH; 20° C. | 50% RH; 20° C. |
| 0 | 0 | >20 min. | >20 min. |
| 10 | 4 | 8.7 s | 3.2 s |

As can be seen from Table II the same conclusions can be drawn concerning charge decay times as in table I, with the expected higher decay time at lower relative humidity conditions. Lateral Surface Resistances are accordingly showing the same trends.

Example 3

A gelatino silver iodobromide X-ray emulsion comprising 99 mole % of silver bromide and 1 mole % of silver iodide was prepared as described in example 1 of EP-Application 92200420.5, filed on Feb. 14, 1992.

Chemical sensitization of said emulsion was performed by the addition of a sulphur and gold sensitizer and digestion at 50° C. to the point where the highest sensitivity was reached for a still acceptable fog level.

The emulsion was coated at both sides of a blue polyethylene terephtalate support having a thickness of 175 μm in amounts of 10.5 g, expressed as silver nitrate, per square meter. Before coating stabilizers as 5-methyl-7-hydroxy-5-triazolo-[1,5-a]-pyrimidin and 1-phenyl-5-mercaptotetrazol were added to the emulsion. Both emulsion layers were covered with a protective layer of 1.4 grams of gelatin per square meter and hardened with di-(vinyl-sulphonyl)methane.

The unexposed film described hereinbefore was packed in a wrapper consisting of a polyethylene terephtalate layer, a vacuum deposited aluminum layer, a light-tight carbon-black pigmented low-density polyethylene layer and an easy peel resin coat comprising low-density polyethylene, mixed with a non-compatible polymer, said resin coat layer being in contact with the protective antistress coatings on both sides of the film. The low-density polyethylene layer was heat-sealed. The package described hereinbefore was used as comparative example.

In accordance with this invention the protective antistress layers at both sides of the film support as well as the easy peel resin coat were spray-coated as described in WO 92014188 with amounts of 10 $mg/m^2$ of $C_7F_{15}CONH-(CH_2-CH_2)_n-(O-CH_2-CH_2-)_m-OH$ (compound A) and 4 $mg/m^2$ of the ammonium salt of perfluorocaprilic acid (compound B). The package in accordance with this invention thus contains two spray coated layers with the same composition in intimate contact with each other.

After removal of the unexposed radiographic films (comparative and invention) from the light-tight packages the radiographic film was developed, fixed, rinsed and dried in an automatic machine processing cycle of 8 minutes.

The film was run in a Structurix NDT-1 machine marketed by Agfa-Gevaert and developed at 28° C. in the commercially available Agfa-Gevaert NDT-developer G135 followed by a fixation step using Agfa-Gevaert commercial G335 fixer.

The presence of sparks due to static decharging phenomena at the moment the removal took place was evaluated qualitatively.

It was observed (invention) that the number of sparks was markedly reduced if a spray-coated antistatic layer was applied onto the protective antistress layers on both sides of the film, as well as on the inner side of the wrapper. Without antistatic spray-coated layer(s) (comparative example) quite a lot of sparks were still observed.

We claim:

1. A radiographic film package for non-destructive testing purposes, comprising a radiographic film sheet which is composed of a film support coated at both sides with one or more silver halide emulsion layer(s) and one or more non-light sensitive protective antistress coating(s) thereover, and a wrapper around said film sheet which is light-opaque and air-tight, and which comprises a heat-sealable thermoplastic layer at the inner side of the wrapper, a polyethylene terephthalate layer at the outer side of the wrapper and a layer of aluminum located between said polyethylene terephthalate layer and said heat-sealable thermoplastic layer, at least one antistatic layer coating provided between the said thermoplastic layer of said wrapper and the emulsion layer(s) of said film sheet, said film package being free of a lead film or foil, to provide a film package for non-destructive testing purposes including with low energy X-ray exposure.

2. A radiographic film package according to claim 1 wherein the said at least one antistatic layer coating is provided on the thermoplastic layer of the wrapper or on an easy peel resin layer coated thereover.

3. A radiographic film package according to claim 2 wherein at least one antistatic coating layer is also provided on the protective coating of the film material.

4. A radiographic film package according to claim 2 wherein the antistatic coating layer(s) comprise at least one fluorinated agent.

5. A radiographic film package according to claim 4 wherein said fluorinated agent is selected from the group consisting of perfluorocaprilic acid or a salt thereof and a hydrophilic polymer with polyoxyethylene units and a terminal fluorinated group.

6. A radiographic film package according to claim 4 wherein said fluorinated agent is a hydrophilic polymer with polyoxyethylene units and a terminal fluorinated group corresponding to the formula $$R_F-A-X \qquad (I)$$

wherein:
- $R_F$ stands for a partly or wholly fluorinated hydrocarbon chain comprising at least 3 fluorine atoms,
- A stands for a chemical bond, a bivalent hydrocarbon group including a bivalent hydrocarbon group interrupted by one or more hetero atoms, or the group —COO, —CON(R)—, —SO$_2$N(R)— or SO$_2$N(R)CO wherein R is hydrogen or alkyl comprising from 1 to 5 C-atoms,
- X stands for a hydrophilic oxyalkylene group containing one or more oxyethylene groups.

7. A radiographic film package according to claim 2 wherein at least one polyethylene oxide compound is present in the antistatic layer coating, said polyoxyethylene compound corresponding to formula (II):

$$R-O-(CH_2CH_2O)_n-H \qquad (II)$$

wherein n is an integer of at least 4 and R represents a long chain alkyl or alkylaryl group having at least 10 C-atoms.

8. A radiographic film package according to claim 7 wherein n is an integer having a value of between 8 and 30 C-atoms.

* * * * *